United States Patent
Albuquerque et al.

(10) Patent No.: US 11,420,595 B2
(45) Date of Patent: Aug. 23, 2022

(54) CLEANING UNIT FOR CLEANING FOREIGN MATTER FROM A COVER, IN PARTICULAR A COVER OF A TRANSMITTER/RECEIVER WINDOW OF A DRIVING ENVIRONMENT SENSOR, AND DEVICE FOR SENSING THE ENVIRONMENT AND METHOD

(71) Applicant: Robert Bosch GmbH, Stuttgart (DE)

(72) Inventors: Andre Albuquerque, Penalva do Castelo (PT); Annemarie Holleczek, Stuttgart (DE); Joao Oliveira, Braga (PT); Pedro Caldelas, Braga (PT); Ricardo Andre, Braga (PT); Maria Vorontsova, Braga (PT)

(73) Assignee: Robert Bosch GmbH, Stuttgart (DE)

( * ) Notice: Subject to any disclaimer, the term of this patent is extended or adjusted under 35 U.S.C. 154(b) by 287 days.

(21) Appl. No.: 16/415,391

(22) Filed: May 17, 2019

(65) Prior Publication Data
US 2019/0359176 A1 Nov. 28, 2019

(30) Foreign Application Priority Data
May 25, 2018 (DE) ...................... 10 2018 208 266.9

(51) Int. Cl.
*B60S 1/08* (2006.01)
*B60S 1/56* (2006.01)
(Continued)

(52) U.S. Cl.
CPC ............... *B60S 1/0848* (2013.01); *B60S 1/56* (2013.01); *G01S 7/4043* (2021.05);
(Continued)

(58) Field of Classification Search
CPC .. B60S 1/62; B60S 1/56; B60S 1/0848; B60S 1/44; B60S 1/46; B60S 1/02; B60S 1/485;
(Continued)

(56) References Cited

U.S. PATENT DOCUMENTS

| 3,626,543 A | 12/1971 | Schaper |
| 6,446,301 B1 | 9/2002 | Kemp |

(Continued)

FOREIGN PATENT DOCUMENTS

| DE | 2203269 A1 | 8/1973 |
| DE | 2413290 A1 | 12/1974 |

(Continued)

*Primary Examiner* — Katina N. Henson
(74) *Attorney, Agent, or Firm* — Norton Rose Fulbright US LLP; Gerard Messina

(57) ABSTRACT

A cleaning unit for cleaning foreign matter from a cover, in particular a cover of a transmitter/receiver window of an environment sensor, including at least one movable wiper blade, which is arranged so as to wipe off foreign matter such as water or dirt on the cover by movement along the cover. For this purpose, the wiper blade touches the cover for example with one or multiple rubber lips. The wiper blade is positioned in an inclined manner with respect to a direction of movement of the wiper blade and is thus movable in such a way that a force exerted by the moved wiper blade on the foreign matter has a component in the direction of the force of gravity. Also described is a related device for sensing the environment as well as a method for cleaning a cover.

4 Claims, 11 Drawing Sheets

(51) Int. Cl.
  *G02B 27/00* (2006.01)
  *G01S 7/52* (2006.01)
  *G01S 7/497* (2006.01)
  *G01S 7/481* (2006.01)
  *G01S 7/40* (2006.01)

(52) U.S. Cl.
  CPC ..... *G01S 7/4813* (2013.01); *G01S 2007/4977* (2013.01); *G01S 2007/52011* (2013.01); *G02B 27/0006* (2013.01)

(58) Field of Classification Search
  CPC .. B08B 1/04; B08B 1/00; H04L 29/08; G05D 1/00; G01S 7/497; G01S 7/481; G01S 7/4813
  USPC .......................... 15/250.22, 250.001, 250.29
  See application file for complete search history.

(56) References Cited

U.S. PATENT DOCUMENTS

| | | |
|---|---|---|
| 7,007,340 B1 | 3/2006 | James |
| 2012/0000024 A1 | 1/2012 | Layton |
| 2013/0255024 A1* | 10/2013 | Kaminaga ............... B60S 1/522 15/250.03 |
| 2016/0244028 A1* | 8/2016 | Wakatsuki ................ B60S 1/62 |
| 2016/0315564 A1 | 10/2016 | Kotani |

FOREIGN PATENT DOCUMENTS

| | | |
|---|---|---|
| DE | 2413354 A1 | 12/1974 |
| DE | 19546862 A1 | 6/1997 |
| DE | 102013018143 A1 | 6/2015 |
| DE | 202016103138 | 7/2016 |
| DE | 102016200835 A1 | 8/2016 |
| DE | 102016006039 | 11/2016 |
| DE | 102017100741 A1 | 7/2018 |
| EP | 1238874 A1 | 9/2002 |
| FR | 2423382 A1 | 11/1979 |
| FR | 2827241 A1 | 1/2003 |
| FR | 2831124 A1 | 4/2003 |
| GB | 213706 A | 4/1924 |
| GB | 2535862 | 8/2016 |
| WO | 2008040683 A1 | 4/2008 |
| WO | 2015/003705 | 1/2015 |
| WO | 2018077040 A1 | 5/2018 |

* cited by examiner

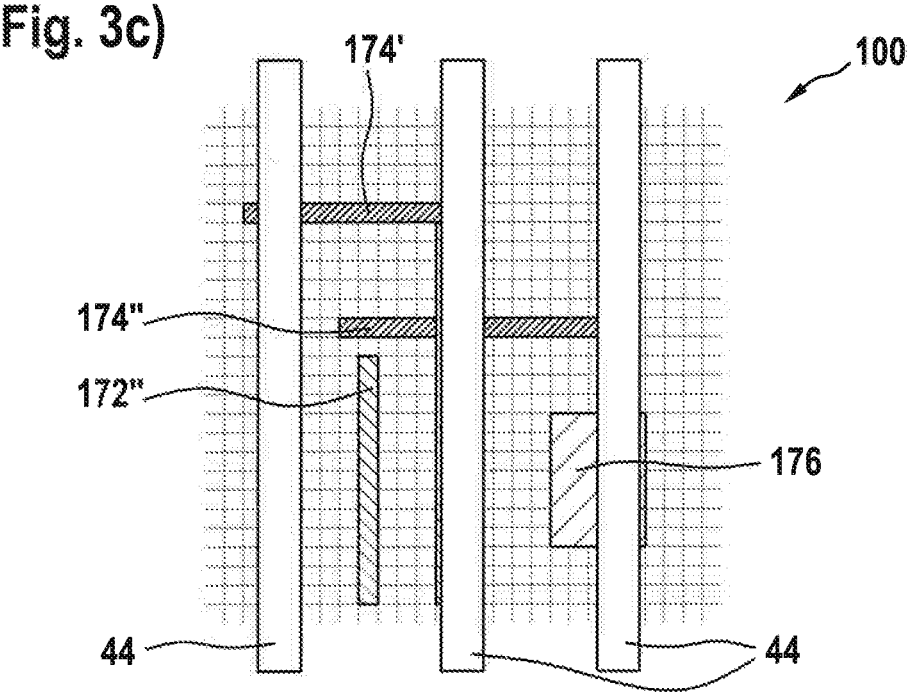
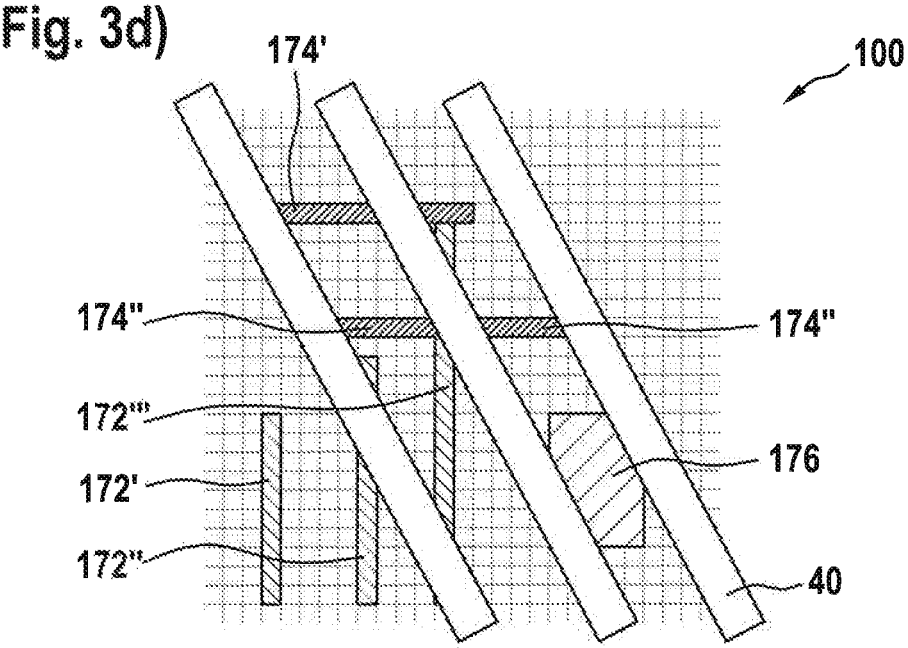

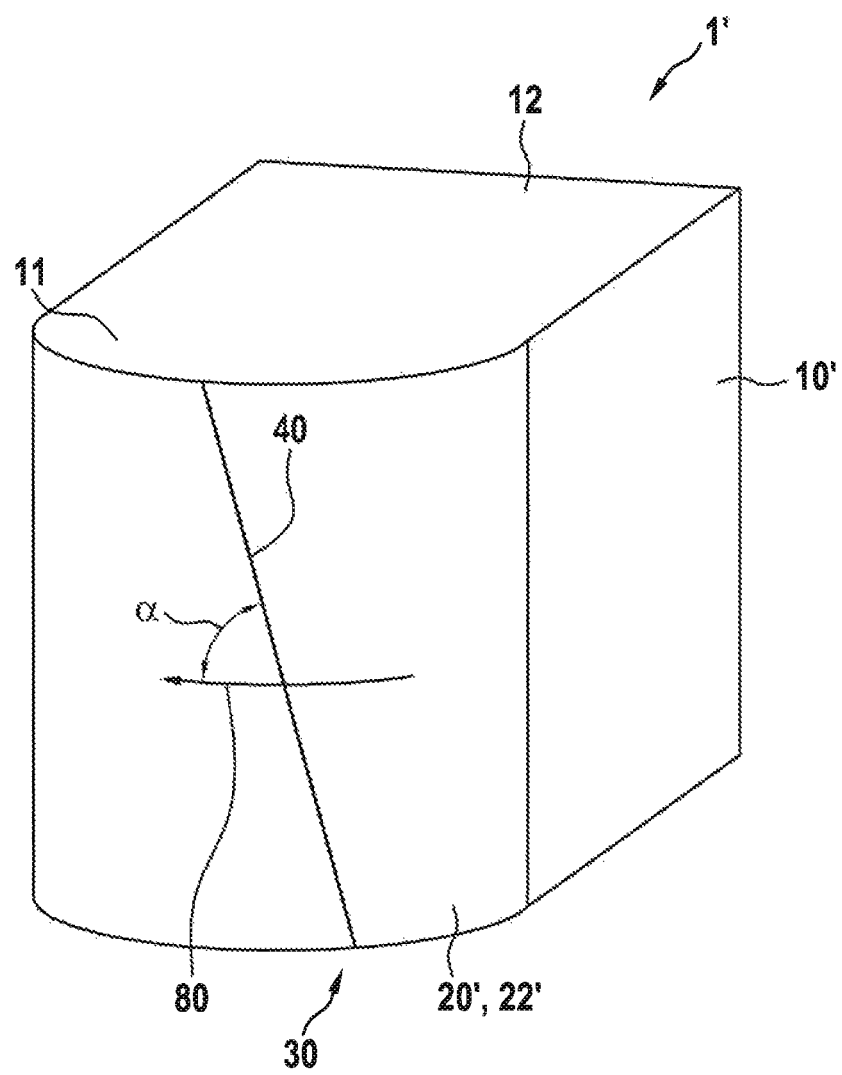

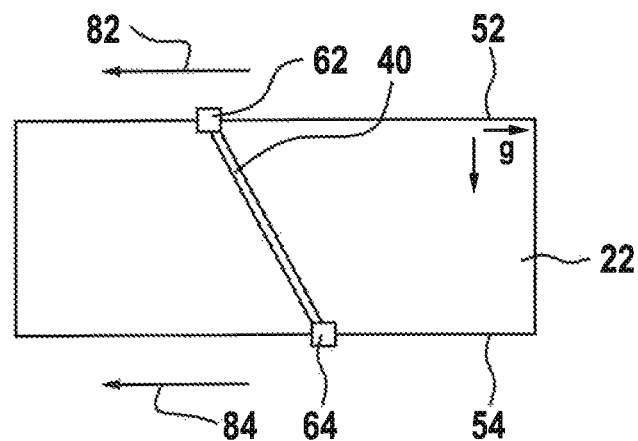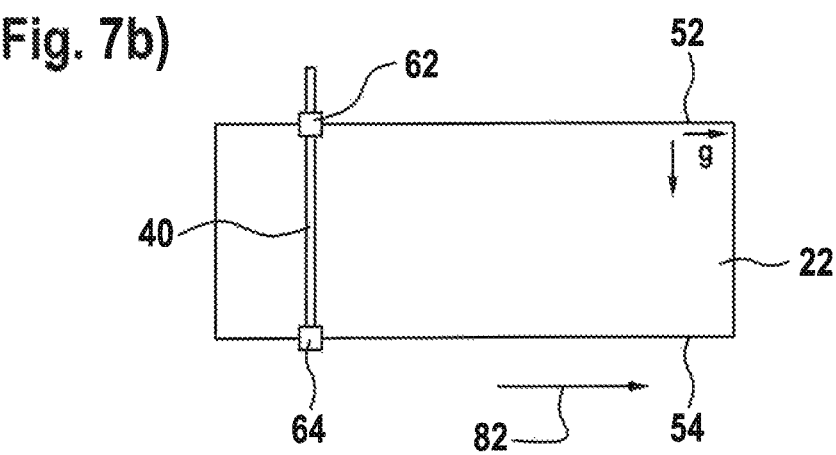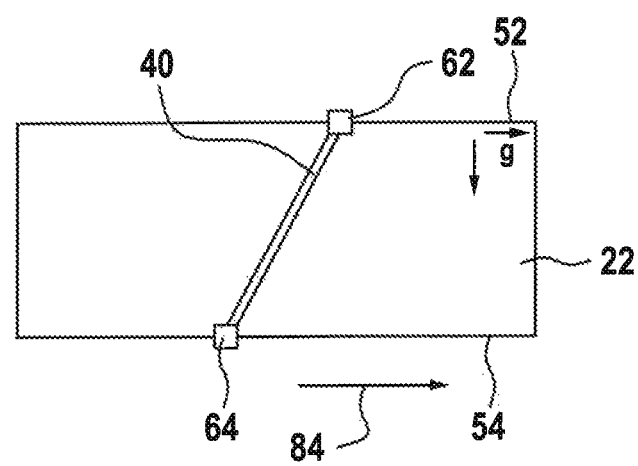

CLEANING UNIT FOR CLEANING FOREIGN MATTER FROM A COVER, IN PARTICULAR A COVER OF A TRANSMITTER/RECEIVER WINDOW OF A DRIVING ENVIRONMENT SENSOR, AND DEVICE FOR SENSING THE ENVIRONMENT AND METHOD

FIELD OF THE INVENTION

The present invention relates to a cleaning unit for cleaning foreign matter from a cover, in particular a cover of a transmitter/receiver window of a driving environment sensor, to a device configured for sensing the environment and to a method for cleaning a cover of such a device.

BACKGROUND INFORMATION

The ability to sense an environment of a vehicle completely with the aid of sensors is a fundamental precondition for automated driving. For this purpose, different driving environment sensors are used such as, for example, radar sensors, ultrasonic sensors, cameras and LIDAR systems, which must be respectively integrated into a vehicle. Typically, environment sensors of a vehicle may be exposed to harsh environmental conditions. Various kinds of soiling may occur. In the case of a camera or a LIDAR sensor, for example, soiling may influence the signal quality significantly if soiling of the cover of a transmitter/receiver window blocks light to be transmitted or to be received for example. In the worst case, the respective sensor is unable to provide any or able to provide only incomplete or faulty information about the environment of the vehicle. Particularly in autonomous driving this is unacceptable, and a mechanism for removing soiling of the sensor must be provided.

Various cleaning systems are known from the related art. Thus, GB2535862 A1 for example discloses a cleaning system that is developed as a cleaning film, which is installed in the housing of an optical sensor. Wiper systems are discussed in DE 102016006039 A1, US2016/0315564 A1, DE 202016103138 U1 and WO 2015/003705 A1, for example, which remove dirt from the cover of a transmitter/receiver window of a sensor using a wiper blade of the type of a windshield wiper. These wiping system share the feature that they either rotate about a pivot point or are oriented parallel with respect to the vertical or horizontal field of view (reception area) of the driving environment sensor.

Wiper systems of this type having linear wiper blades have various disadvantages. If the movement of the wiper blade runs in planar fashion parallel to the ground plane, then all foreign matter (e.g. water and dirt) are carried along to the edge of the system and are only then wiped off. This may result in resoiling and is thus inefficient.

If the movement of the wiper blade occurs in a plane perpendicular to the ground plane (up and down movement as in US 2016/0315564 A1 for example), this has the result that foreign matter is moved on the cover during the upward movement of the wiper blade against gravitation and may be smeared anew over the cover in the subsequent downward movement. A similar effect may result in a more attenuated manner if from a fixed pivotal point a linear wiper blade is swiveled back and forth in front of the cover to be cleaned: Water and dirt are pushed upward against the force of gravitation and possibly remain on the cover when the wiper blade changes direction. In the case of a wiper blade that is oriented perpendicularly with respect to the ground plane, which is moved parallel to the ground plane (in planar fashion or along a cylindrical surface, see DE 102016006039 A1), foreign matter is pushed in a direction perpendicular to the force of gravitation, while the supporting effect of the gravitational force is not utilized.

SUMMARY OF THE INVENTION

The present invention is based on the objective of ensuring the availability of a driving environment sensor, in particular an optoelectronic sensor or a camera. Transparent covers of the driving environment sensor should be kept clean reliably and effectively and, if they are soiled, they should be efficiently and reliably freed of foreign matter and subsequently should be in particular dried or kept dry.

According to the present invention, a cleaning unit is provided for cleaning foreign matter from a cover, in particular a cover of a transmitter/receiver window of a driving environment sensor. The cleaning blade comprises at least one movable wiper blade, which is disposed so as to wipe off foreign matter such as water or dirt on the cover by movement along the cover. For this purpose, the wiper blade touches the cover for example with one or multiple rubber lips. According to the invention, the wiper blade is disposed in an inclined manner with respect to a direction of movement of the wiper blade and is thus movable in such a way that a force exerted on the foreign matter by the moved wiper blade has a component in the direction of the force of gravity.

An inclined disposition of the wiper blade with respect to the direction of movement is understood as a disposition in which the longitudinal extension of the wiper blade is oriented neither parallel nor perpendicular to the direction of movement, but rather has an angle of inclination $\alpha$, where $0°<\alpha<90°$. According to the invention, the wiper blade is thereby inclined with respect to the direction of movement in such a way that a force exerted by the moved wiper blade on the foreign matter has a component in the direction of the gravitational force.

The configuration of the present invention yields the following advantages:

Because of the fact that a force exerted by the moved wiper blade on the foreign matter has a component in the direction of the gravitational force, the gravitational force supports the cleaning effect of the wiper blade. Foreign matter on the cover is pushed into the direction of the ground and is thus removed from the cover more quickly and efficiently. The danger of re-soiling is reduced and drying is accelerated.

The inclination of the wiper blades furthermore achieves the advantage that in an optical recording of the environment, the wiper blades interfere less with the measuring result, even if during measurement the transmitter/receiver window is partially covered by the wiper blade or the wiper blades. This is due to the fact that most objects in the real world in the environment of the device, which are to be detected by the device, are oriented either horizontally or vertically (e.g. lamp posts, persons, barriers, etc.) and are therefore normally not completely concealed by an inclined wiper blade. This is especially important when sensing the environment of vehicles driving autonomously or partly autonomously since in these cases objects must be detected as reliably as possible and which may be in real time in order to avoid risks.

All in all, the present invention makes it possible to keep the cover of the device configured in accordance with the present invention effectively clean and, if it is soiled, to free it efficiently and reliably from foreign matter, the impairment of a measurement being performed in the meantime by the driving environment sensor of the device being minimized.

In a development of the present invention, the cleaning unit comprises precisely one wiper blade.

In an alternative development of the present invention, the cleaning unit comprises a plurality of wiper blades, in particular two or three wiper blades.

In one possible development, the multiple wiper blades are developed to be of the same kind and are arranged parallel to each other. Alternatively, the multiple wiper blades may be developed differently and/or arranged differently from one another, for example having different lengths and/or curvatures, and may be arranged in such a way that the wiper blades respectively have different angles of inclination with respect to the direction of motion.

In one possible development of the present invention, at least one wiper blade has a curvature. The curvature may be developed for example in the plane of the transmitter/receiver window or cover or may be perpendicular to it. Alternatively or additionally, at least one wiper blade may have at least two segments, the segments having different angles of inclination with respect to the direction of movement.

In one possible development of the present invention, the cover is developed to be curved and the one or the multiple wiper blades are adapted to the curvature of the cover. The housing may be developed in cylindrical fashion, for example. It is nevertheless possible to achieve a continuous contact of each wiper blade with the surface of the cover because of the inclination of the wiper blade(s) and because of the adaptation of the curvature.

By selecting the number, arrangement and configuration of the wiper blade(s), it is possible to adapt the cleaning unit optimally to the condition, shape and arrangement of the cover.

The cleaning unit may advantageously have one or multiple rails, one or multiple wiper blades being disposed on the rails e.g. by one or both ends and being movable by one or multiple drive units along the one rail or the multiple rails in order to clean the cover.

In one development of the present invention, the cleaning unit has two rails that are in particular respectively disposed above and below the cover. A wiper blade is supported on the first rail by a first pivotal point and on the second rail by a second pivotal point. The pivotal points themselves may be moved along the respective rail. The wiper blade is moved back and forth in such a way that one of the pivotal points moves more slowly than the other pivotal point. This may be implemented in that both pivotal points are moved by one drive for example. Alternatively, it is also possible that only one pivotal point is moved by a drive, while the other pivotal point follows the movement of the driven pivotal point in delayed fashion by friction, without being itself driven.

This makes it possible that even in a back-and-forth movement of the wiper blade, that is, in a change in the direction of movement by 180°, there exists essentially an inclination of the wiper blade with respect to the current direction of movement in such a way that a force exerted by the moved wiper blade on foreign matter on the cover has a component in the direction of the force of gravitation. In this embodiment, no component in the direction of the force of gravity exists only at the points in time at which the pivotal points come to lie exactly one above the other. The durations of remaining in this position of the wiper blade, however, are negligibly brief in comparison to the total duration of a cleaning process. Alternatively, it is possible to select the position, in which the pivotal points come to lie exactly one above the other, in such a way that it lies outside of the cover or at least outside of the sensing region of the sensor, e.g., in the region of a specified position of rest of the wiper blade. The change in distance caused by the different movements of the pivotal points is compensated for in that the wiper blade is configured for example to be variable in its length and/or is supported in such a way on one or both pivotal points that it is shiftable beyond the rail.

The cleaning unit may have additionally at least one nozzle that is configured to rinse and/or dry the cover. For this purpose, the nozzle may spray or blow a cleaning fluid (e.g. water) or air onto the cover, the respective nozzle being connected to a respective reservoir. The nozzle or nozzle(s) may be disposed in front of and/or behind the wiper blade in the direction of movement and may move for example together with the wiper blade. If multiple wiper blades are present, one or multiple nozzles may be disposed between the wiper blades. The nozzle or nozzles may also be installed in a fixed manner on the housing, for example.

In one possible development of the present invention, the cleaning unit additionally has a detector unit, which is configured to detect a soiling of the cover. It is then possible to control the cleaning unit as needed, when the detector unit has detected soiling. The detector unit may comprise for example a camera or an optical sensor.

The present invention also provides a device, configured for sensing the environment, in particular for sensing the environment of a vehicle. The device has a housing, at least one driving environment sensor, in particular an optoelectronic sensor such as a LIDAR sensor for example, and/or a camera being situated within the housing. The housing has a transmitter/receiver window for the signals transmitted from the sensor into the environment and/or for the signals received by the sensor from the environment. The device furthermore has a cover, the cover being configured to be transparent for the transmitted and/or received sensor signals and covering the transmitter/receiver window with respect to an external environment of the device. The device has a cleaning unit configured in accordance with the present invention for cleaning foreign matter such as water, dirt or dust, for example, from the cover.

According to a further aspect of the present invention, a method is provided for cleaning foreign matter from a cover, in particular a cover of a device for sensing the environment configured as described above. For this purpose, at least one wiper blade of a cleaning unit is moved along the cover in such a way that the force exerted by the moved wiper blade on the foreign matter has a component in the direction of the force of gravity.

BRIEF DESCRIPTION OF THE DRAWINGS

FIGS. 7a), 7b), and 7c) show another exemplary embodiment of the present invention in which the direction of movement of the wiper blade changes.

DETAILED DESCRIPTION

Figure 1A:
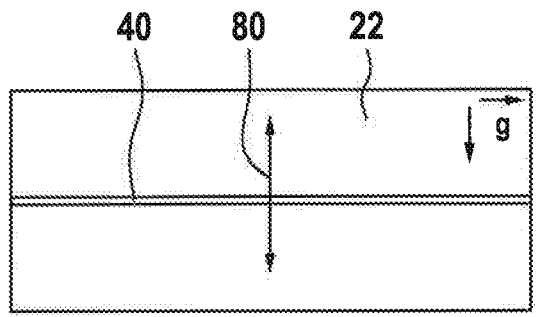
FIGS. 1a), 1b), 1c), and 1d) schematically show different examples of the movement of a wiper blade for cleaning a surface, for example a cover of an environment sensor, according to the related art.

Identical elements are designated by the same reference numerals in the following description of the exemplary embodiments of the present invention, a repeated description of these elements being omitted if indicated. The figures represent the subject matter of the present invention only schematically.

FIGS. 1a) and 1b) schematically show a first system for cleaning a cover 22 according to the related art. A wiper blade 40 is disposed so as to be movable along cover 22. The wiper blade is able to move upward and downward, as illustrated by arrow 80. Wiper blade 40 is accordingly situated perpendicularly with respect to its direction of movement.

Figure 1B:
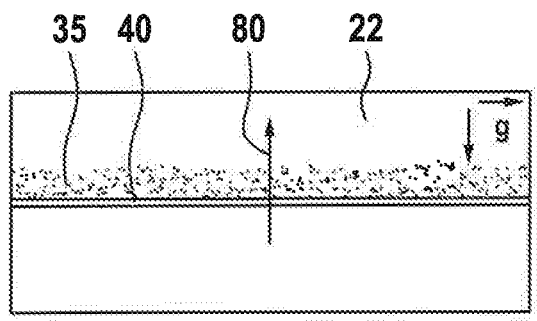

FIG. 1b) shows the situation in which the wiper blade of the system from FIG. 1a) moves upward, that is, counter to the direction of the gravitational force g. Foreign matter 35 such as water, dust or dirt for example are pushed upward by wiper blade 40, wiper blade 40 thus exerting a force on foreign matter 35 whose direction runs counter to the direction of gravitational force g. This results in a lack of efficiency. Furthermore, a subsequent downward movement of the wiper blade promotes a re-soiling of cover 22 with foreign matter 35.

Figure 1C:
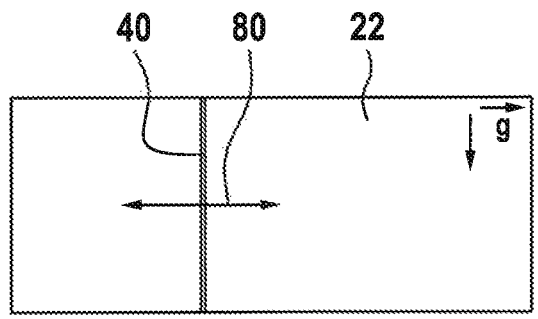

FIGS. 1c) and 1d) schematically show a second system for cleaning a cover 22 according to the related art. A wiper blade 40 is disposed so as to be movable along cover 22. The wiper blade is able to move to the right and to the left, as illustrated by arrow 80. Wiper blade 40 is accordingly situated perpendicularly with respect to its direction of movement 80.

Figure 1D:
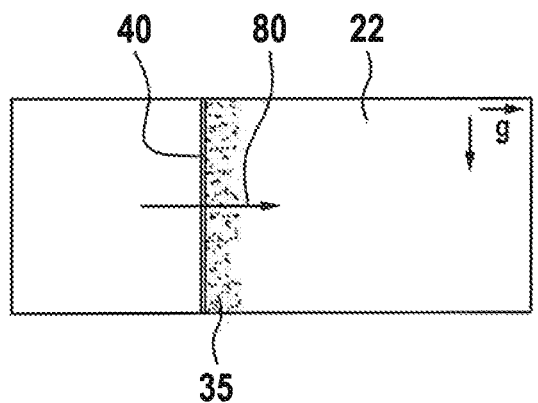

FIG. 1d) shows the situation in which the wiper blade of the system from FIG. 1c) moves to the right, that is, perpendicularly with respect to the direction of gravitational force g. Foreign matter 35 such as water, dust or dirt for example are pushed to the right by wiper blade 40, the wiper blade thus exerting a force on foreign matter 35 whose direction always runs perpendicularly to the direction of gravitational force g. This results in a lack in efficiency since the supporting effect of the gravitational force is not utilized.

Figure 2A:
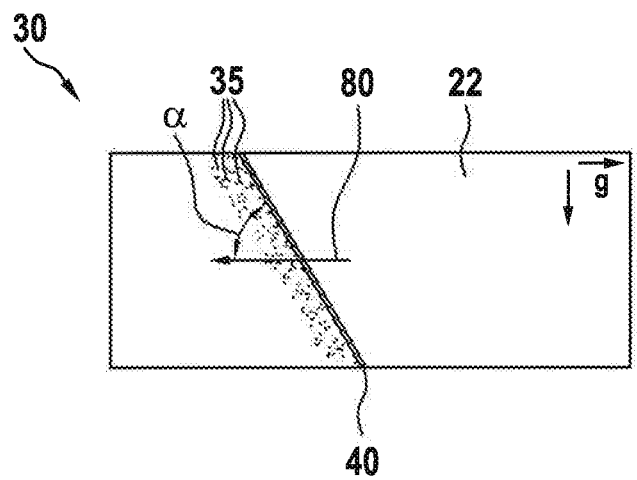
FIG. 2a) schematically shows a movement of a wiper blade for cleaning a surface, for example a cover of an environment sensor, according to a first exemplary embodiment of the present invention.

FIG. 2a) shows a cleaning unit 30 according to a first exemplary embodiment of the present invention. Cleaning unit 30 has a wiper blade 40, which is movable along a cover 22 in direction 80, that is, to the left. Foreign matter 35 is located on cover 22 which is to be removed. Wiper blade 40 is disposed in inclined fashion at an angle of inclination α with respect to direction of movement 80. When wiper blade 40 is moved along cover 22, for example by a drive unit (not shown), the moved wiper blade 40 exerts a force 70 on foreign matter 35. Due to the inclination of wiper blade 40, force 70 always has a component 72 in the direction of gravitational force g.

Figure 2B:
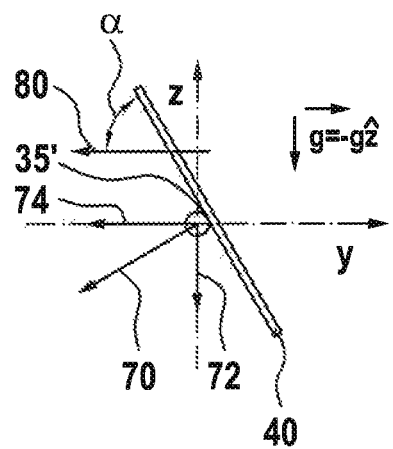
FIG. 2b) illustrates the forces involved and their components.

This is shown in detail in FIG. 2b). Force 70 acting on a foreign matter particle 35' may be decomposed into two vector components, a first component 74 perpendicular with respect to the direction of gravitational force g 80 and a second component 72 parallel to the direction of gravitational force g.

It is clear that at a defined angle of inclination α the direction of movement 80 is defined. Thus, if e.g. a back-and-forth movement of wiper blade 40 is provided in front of the cover, a change in the direction of movement 80 must be accompanied by a corresponding change of the angle of inclination α so as to maintain the condition of the present invention that wiper blade 40 is situated to be inclined with respect to direction of movement 80 of wiper blade 40 and to be movable in such a way that a force 70 exerted by moved wiper blade 40 on foreign matter 35 on the cover always has a component 72 in the direction of gravitational force g. This may occur for example by swiveling wiper blade 40 accordingly.

Figure 3A:
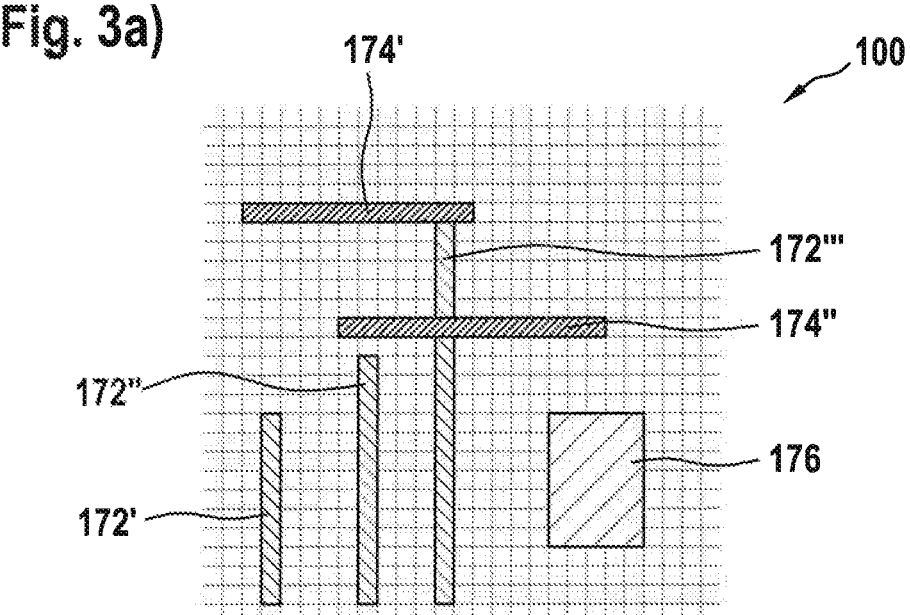
FIGS. 3a), 3b), 3c), and 3d) schematically show the concealment of a scene in the environment sensed by a device configured for sensing the environment by wiper blades of a cleaning unit for different arrangements of the wiper blades.

FIG. 3 shows the view onto a scene of the environment 100 from the perspective of a sensor, for example a camera. The sensor senses the environmental scene 100 through a transparent cover 22, which is made for example of glass or a plastic such as e.g. PC or PMMA. FIG. 3a) shows a free field of view of the sensor onto the environmental scene. Environmental scene 100 includes various objects that are detected by the sensor. In this example, the objects comprise three vertically oriented objects 172', 172", 172"', for example masts. In addition there are two horizontally oriented objects 174' and 174", for example barriers or curbs. The environmental scene 100 furthermore contains an extended object 176, for example a vehicle.

Figure 3B:
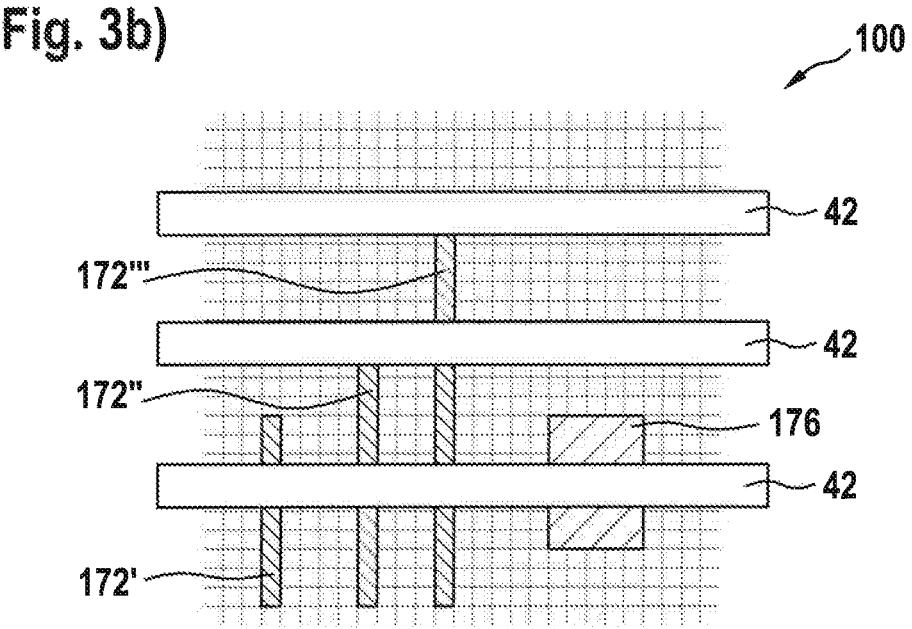

In FIGS. 3b) through d), the field of view of the sensor is partially concealed by wiper blades 40, 42, 44 of a cleaning unit. FIGS. 3b) and 3c) show the arrangement of wiper blades in accordance with the related art: In FIG. 3b), three wiper blades 42 are arranged horizontally. This arrangement has the result that horizontal objects 174' and 174" may be concealed entirely by wiper blades 42. In FIG. 3c), three wiper blades 44 are arranged vertically. This arrangement has the result that vertical objects 172', 172" and 172"' may be concealed entirely by wiper blades 44. In FIG. 3d), three wiper blades 40 are arranged in inclined fashion in accordance with the present invention. This arrangement has the result that at no point in time is one of objects 172', 172", 172"', 174' or 174" concealed entirely for the sensor. This is advantageous particularly when sensing the environment in vehicles that drive autonomously or partially autonomously since in this application objects in the environment of the vehicle must be detected by the sensor as reliably as possible and which may be in real time in order to avoid for example endangerment of the vehicle or of other road users.

FIG. 4 shows two exemplary embodiments of cleaning units 30 of the present invention having each one wiper blade 40.

Figure 4A:
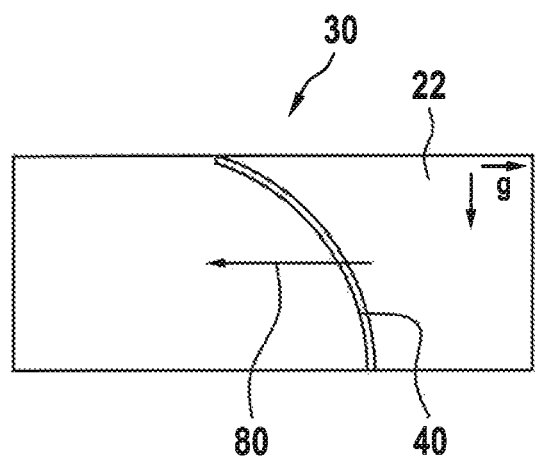
FIGS. 4a) and 4b) show two exemplary embodiments of the present invention having differently configured wiper blades.

In cleaning unit 30 illustrated in FIG. 4a), wiper blade 40 is configured to be curved, the curvature running in the plane of the cover. Wiper blade 40 thus has an angle of inclination α with respect to the direction of motion 80 which changes continuously over its longitudinal extension.

Figure 4B:
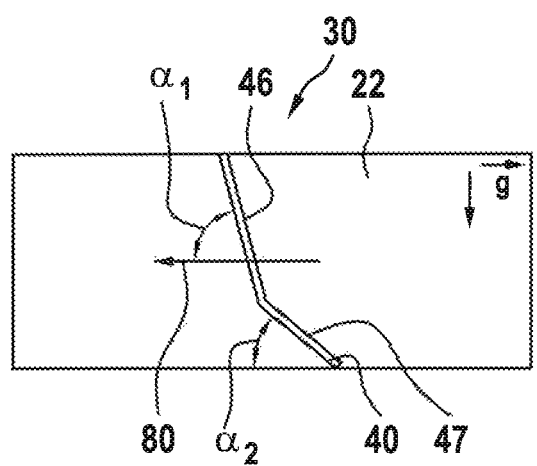

In the cleaning unit 30 illustrated in FIG. 4*b*), wiper blade 40 has two segments 41 and 42, the segments 46 and 47 having different angles of inclination $\alpha_1$ and $\alpha_2$ with respect to the direction of motion 80. Thus in this example first segment 46 has a greater angle of inclination than second segment 47.

Such nonlinear wiper blades, that is, wiper blades that are not straight, may have advantages in certain applications, depending for example on the geometric shape and/or the material of cover 22.

Thus it may be expected, for example, that more foreign matter such as dirt or water collects at the lower edge of cover 22. The more acute angle of inclination α is, the greater is the force that presses the dirt away in the downward direction.

Figure 5A:
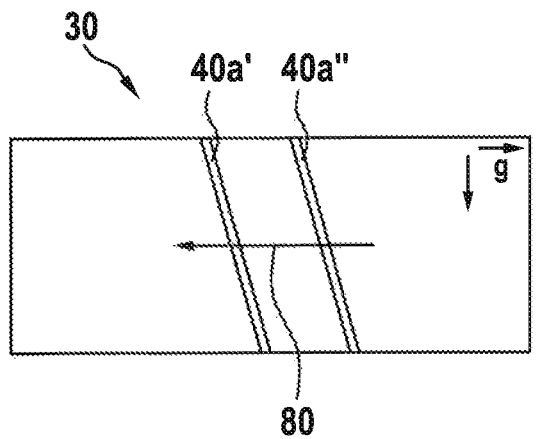
FIGS. 5a), 5b), and 5c) show three exemplary embodiments of the present invention each having two wiper blades.
Figure 5B:
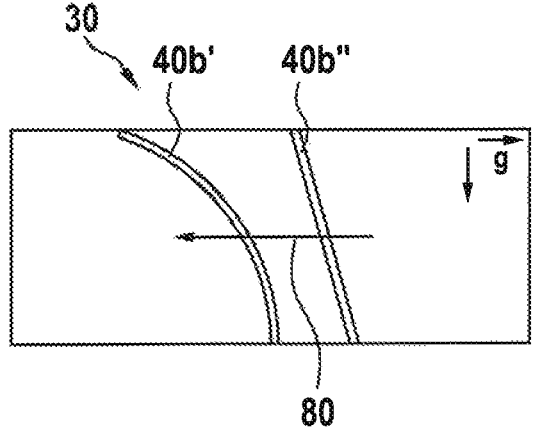
Figure 5C:
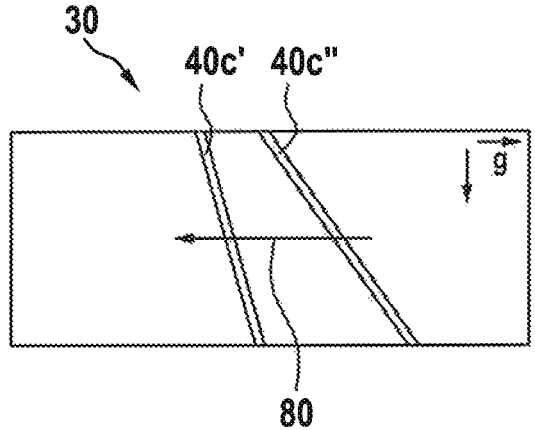

FIG. 5 shows three exemplary embodiments of cleaning units 30 of the present invention having each two wiper blades. In FIG. 5*a*) both wiper blades 40*a*' and 40*a*" are disposed parallel to each other and have the same angle of inclination with respect to their direction of motion 80. In the embodiment according to FIG. 5*b*), a first wiper blade 40*b*' has a curvature. A second wiper blade 40*b*" is configured to be linear and having a constant angle of inclination with respect to direction of motion 80. In the embodiment shown in FIG. 5*c*), a first wiper blade 40*c*' has a different angle of inclination with respect to the direction of motion 80 than a second wiper blade 40*c*".

Figure 6A:
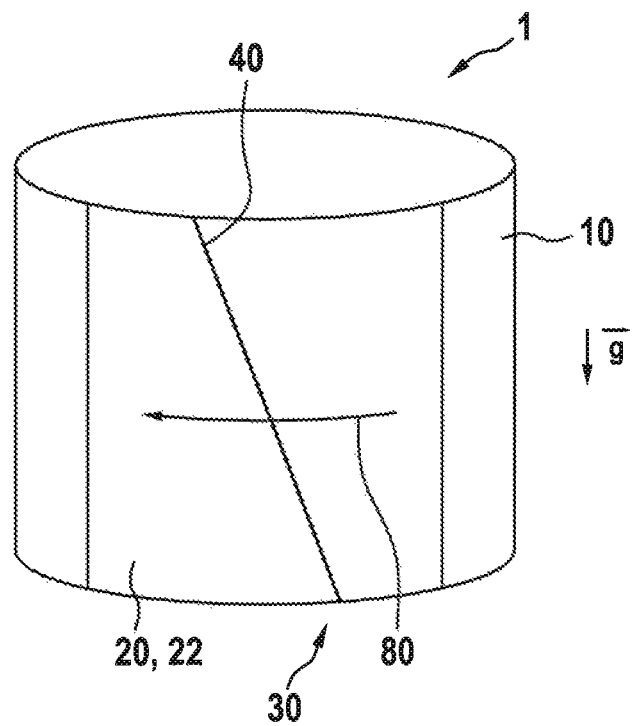
FIGS. 6a) and 6b) schematically show exemplary embodiments of the present invention in which the housing of a device according to the present invention is configured to be cylindrical.
Figure 6B:
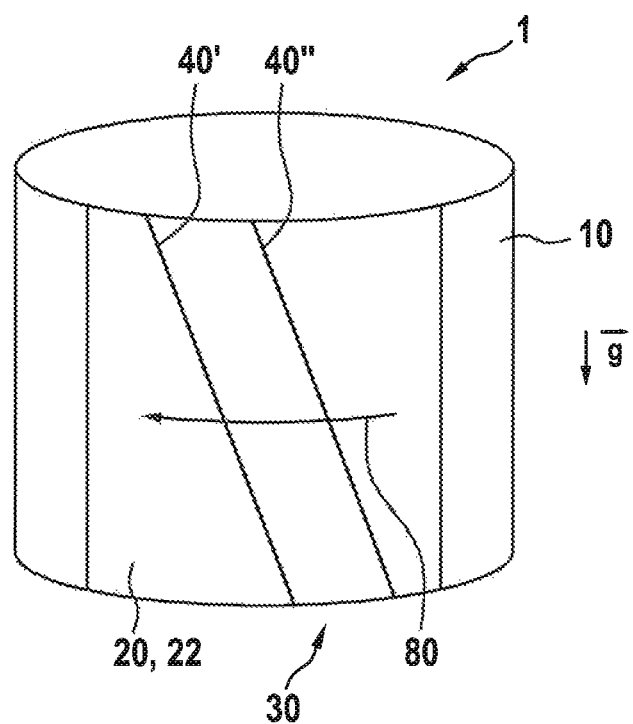
FIG. 6c) shows an alternative specific embodiment of the sensor configured as a semicylinder.

FIG. 6 schematically shows two examples for a device 1 developed in accordance with the present invention for detecting the environment. Device 1 may be for example a Lidar sensor system for sensing the environment of a vehicle. Device 1 comprises a housing 10 as well as at least one sensor situated within housing 10, which is developed in particular as an optoelectronic sensor or as a camera (not shown). The housing is essentially cylindrical. Housing 10 has a transmitter/receiver window 20 and a cover 22, cover 22 being configured to be transparent for sensor signals of the sensor, and cover 22 being configured to cover the transmitter/receiver window 20 with respect to an external environment of device 1. Cover 22 may cover 360° horizontally. Alternatively, it may also cover a smaller angle, as shown in FIG. 6. Device 1 comprises a cleaning unit 30 for cleaning foreign matter from cover 22. In the example shown in FIG. 6*a*), cleaning unit 30 comprises a movable wiper blade 40, which is disposed to wipe foreign matter on cover 22 off by movement, wiper blade 40 being disposed in inclined fashion with respect to the defined direction of motion 80 of wiper blade 40 and being movable in such a way that a force exerted on foreign matter on the cover 22 by moved wiper blade 40 has a component in the direction of the force of gravity. In the example according to FIG. 6*b*), cleaning unit 30 comprises two movable wiper blades 40' and 40", which are disposed parallel to each other and are inclined and movable in such a way that a force exerted by each of the moved wiper blades 40' and 40" on foreign matter on the cover 22 respectively has a component in the direction of the force of gravitation. The movement of the wiper blades 40, 40', 40" occurs for example along one or several rails that are disposed on housing 10 (not shown). Wiper blades 40, 40', 40" may be moved for example by an electrical drive (not shown) along the rails in direction of movement 80.

6*c*) shows an alternative specific embodiment of a device 1' for sensing the environment developed in accordance with the present invention. Device 1' may be for example a Lidar sensor system for sensing the environment of a vehicle. Housing 10' encloses at least one sensor disposed within housing 10', which is developed in particular as an optoelectronic sensor or as a camera (not shown). In this case, housing 10' comprises a semi-cylindrical section 11, which has the transmitter/receiver window 20' and the cover 22', cover 22' being configured to be transparent for sensor signals of the sensor, and cover 22' being configured to cover the transmitter/receiver window 20' with respect to an external surroundings of device 1'. Cover 22 is likewise configured in semi-cylindrical fashion. Housing 10 furthermore has an essentially block-shaped section 12, which adjoins semi-cylindrical section 11. Device 1' comprises a cleaning unit 30 for cleaning foreign matter from cover 22'. In the example shown in FIG. 6*c*), cleaning unit 30 comprises a movable wiper blade 40, which is disposed to wipe foreign matter on cover 22' off by movement, wiper blade 40 being disposed in inclined fashion with respect to the defined direction of motion 80 of wiper blade 40 and being movable in such a way that a force exerted on foreign matter on the cover 22 by moved wiper blade 40 has a component in the direction of the force of gravity. It is conceivable that after passing cover 22' in direction of motion 80, wiper blade 40 changes the direction of movement. In this case, the angle of inclination of wiper blade 40 may be adapted so that in the movement in the other direction a force exerted by moved wiper blade 40 on foreign matter on cover 22 also has a component in the direction of the force of gravity. A pivot mechanism may be provided for this purpose, for example.

In the embodiment of the present invention according to FIG. 7, cleaning unit 30 has two rails 52, 54, which are situated respectively above and below cover 22. A wiper blade 40 is supported by a first pivotal point 64 on first rail 54 and by a second pivotal point on the second rail 52. The pivotal points 62, 64 themselves may be moved along the respective rail 52, 54. Wiper blade 40 is moved back and forth in such a way that first pivotal point 64 moves more slowly than second pivotal point 62, as indicated by the arrows of different length 82 and 84. This may be implemented in that the two pivotal points 62, 64 are moved at different speeds by separate drives, for example. Alternatively, it is also possible that only the second pivotal point 62 is moved by a drive, while the first pivotal point 64 follows the movement of the second pivotal point by friction, in delayed fashion, without being itself driven. This makes it possible that even in a back-and-forth movement of wiper blade 40, that is, in a change of the direction of movement by 180° there exists essentially an inclination of the wiper blade with respect to the current direction of movement in such a way that a force exerted by the moved wiper blade on foreign matter on the cover has a component in the direction of the force of gravitation g. FIGS. 7*a*), *b*) and *c*) show by way of example three points in time of such a movement of wiper blade 40. In this embodiment, there is no component in the direction of the force of gravity g only at the points in time in which the pivotal points 62, 64 come to lie exactly one above the other, as shown in FIG. 7*b*). The durations of remaining in this position of wiper blade 40, however, are negligibly brief in comparison to the total duration of a cleaning process. This position may be advantageously selected in such a way that they come to lie outside of the detecting range of the sensors (for example in a position of rest of wiper blade 40). The change in distance effected by the different movements of pivotal points 62, 64 is compensated for in that wiper blade 40 is supported on second pivotal point 62 in such a way that it may be shifted beyond rail 52, as shown in FIG. 7*b*).

Figure 8A:
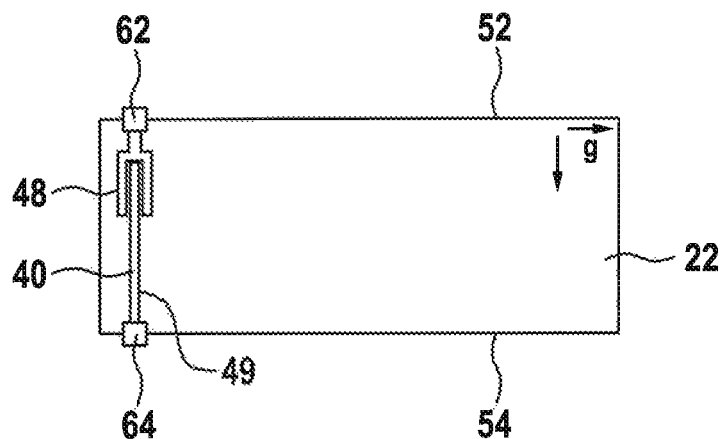
FIGS. 8a) and 8b) show an alternative exemplary embodiment of the present invention in which the direction of movement of the wiper blade changes.
Figure 8B:
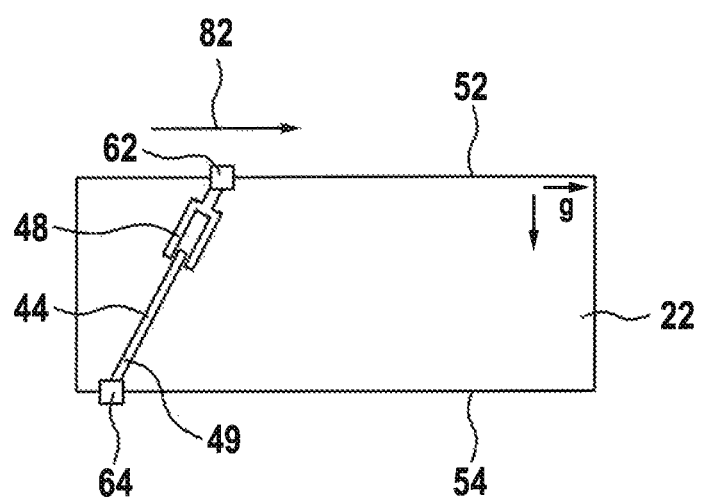

FIG. 8 depicts an alternative embodiment of a cleaning unit according to the present invention. The mode of operation corresponds essentially to the variant described in connection with FIG. 7. In the example shown in FIG. 8, the change in distance effected by different movements of pivotal points 62, 64 is compensated for in that the wiper blade is configured to be variable in its length. This is achieved in that wiper blade 40 has two segments 48 and 49, first segment 48 having a fork-shaped bearing for second segment 49. As a result, second segment 49 is able to form a partial overlap with first segment 48, which makes the length of the entire wiper blade 40 variable. Second segment 49 may be fastened on first segment by a spring for example.

What is claimed is:

1. A device for sensing an environment of a vehicle, comprising:
   a housing, wherein at least one sensor is disposed within the housing, the housing having a transmitter/receiver window and a cover, the cover being transparent for sensor signals of the sensor, and the cover covering the transmitter/receiver window with respect to an external environment of the device; and
   a cleaning unit for cleaning foreign matter from the cover, including at least two movable wiper blades, which is disposed to wipe off foreign matter on the cover by movement, wherein the wiper blade is disposed in an inclined manner with respect to a direction of movement of the wiper blade and is movable so that a force exerted by the moved wiper blade on the foreign matter has a component in the direction of the force of gravity, wherein at least one movable wiper blade is configured to be linear and have a constant angle of inclination with respect to the direction of motion and at least one movable wiper blade is configured to be curved toward the direction of motion and have a constant angle of curvature with respect to the direction of motion.

2. The device of claim 1, wherein at least one of:
   the at least one sensor includes at least one of an optoelectronic sensor or a camera, or
   the cover is a cover of a transmitter/receiver window of an environmental sensor.

3. A method for cleaning foreign matter from a cover of a device for sensing an environment of a vehicle, the method comprising:
   moving at least two wiper blades of a cleaning unit along the cover so that a force exerted on the foreign matter by the moved wiper blade has a component in the direction of a force of gravity;
   wherein the device includes:
      a housing, wherein at least one sensor is disposed within the housing, the housing having a transmitter/receiver window and the cover, the cover being transparent for sensor signals of the sensor, and the cover covering the transmitter/receiver window with respect to an external environment of the device; and
      a cleaning unit for cleaning foreign matter from the cover, including the at least two wiper blades, which is disposed to wipe off foreign matter on the cover by movement, wherein the wiper blade is disposed in an inclined manner with respect to a direction of movement of the wiper blade and is movable so that the force exerted by the moved wiper blade on the foreign matter has a component in the direction of the force of gravity, wherein at least one movable wiper blade is configured to be linear and have a constant angle of inclination with respect to the direction of motion and at least one movable wiper blade is configured to be curved toward the direction of motion and have a constant angle of curvature with respect to the direction of motion.

4. The method of claim 3, wherein the at least one sensor includes at least one of an optoelectronic sensor or a camera, and/or wherein the cover is a cover of a transmitter/receiver window of an environmental sensor.

* * * * *